May 5, 1931.  L. A. SCHERCK  1,804,278

MULTIPLE DRIP COFFEE URN

Filed May 24, 1930

Lewis A. Scherck
INVENTOR

BY Victor J. Evans
ATTORNEY

Patented May 5, 1931

1,804,278

UNITED STATES PATENT OFFICE

LEWIS A. SCHERCK, OF NEW ORLEANS, LOUISIANA

MULTIPLE DRIP COFFEE URN

Application filed May 24, 1930. Serial No. 455,394.

This invention relates to a drip attachment for coffee urns and has as its primary object to provide an attachment of this class by the use of which the boiling water poured in the attachment proper will drip more rapidly through the coffee and thereby produce a much stronger and better flavored beverage than is ordinarly obtained by the use of the ordinary types of urns.

Another object of the invention is to provide a drip attachment for coffee urns which will be so constructed as to entirely eliminate the use of cloth bags, filter papers and the like where a well flavored and strong coffee must be ready for use in a short period of time.

Another object of the invention is to provide an attachment for the purpose stated which may be readily and conveniently applied to the mouth of any ordinary urn and without the use of any securing elements such as bolts or clamps.

This invention also consists in certain other features of construction and in the combination and arrangement of the several parts, to be hereinafter fully described, illustrated in the accompanying drawings and specifically pointed out in the appended claim, it being understood of course that minor changes may be made so long as they fall within the scope of the claim.

In describing my invention in detail, reference will be had to the accompanying drawings, wherein like characters denote like or corresponding parts throughout the several views, and in which.

Figure 3:
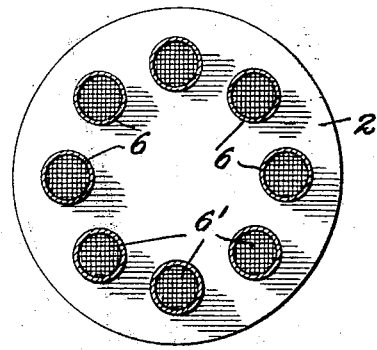
Figure 3 is a horizontal sectional view taken on the line 3—3 of Figure 1 looking in the direction indicated by the arrows.
Figure 1:
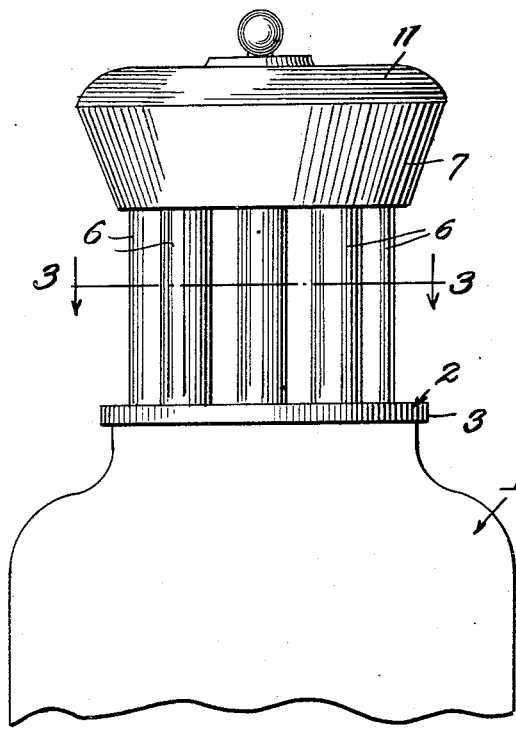
Figure 1 is a view in elevation of the attachment embodying the invention installed upon an urn.
Figure 4:
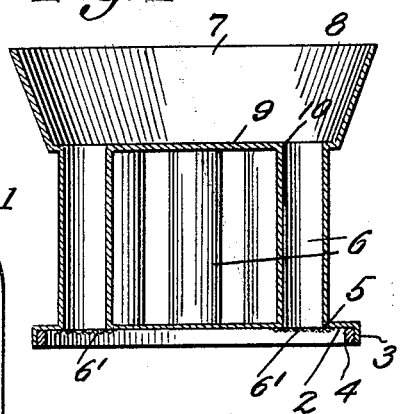
Figure 4 is a vertical diametric sectional view on the line 4—4 of Figure 2 looking in the direction indicated by the arrows.
Figure 2:
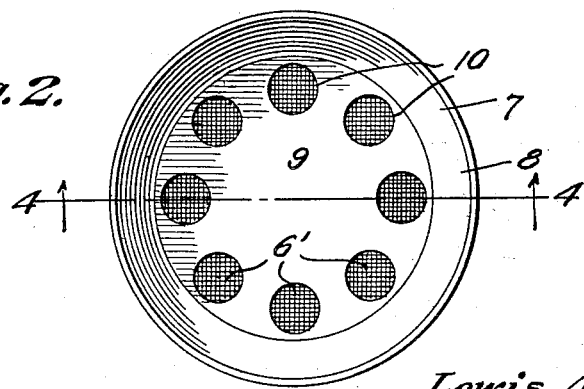
Figure 2 is a bottom plan view of the attachment.

In the drawings the numeral 1 indicates the bowl of an ordinary coffee urn and the attachment embodying the invention comprises a cap 2 which is of circular form and provided with a depending peripheral flange 3 within the circumference of which is arranged a packing ring 4, thus adapting the cap to be frictionally fitted to the mouth of the bowl 1. An annular series of openings 5 are formed in the cap 2 and an annular series of tubes 6 are arranged with their lower ends in communication with these openings, a circular disk 6' of wire mesh being arranged to cover the lower end of each of the tubes 6 so that coffee, in ground condition, introduced into the tubes, will not drop into the water in the bowl 1.

The container indicated in general by the numeral 7, is arranged at the upper end of the tubes 6 and comprises a conical circumferential wall 8 and a bottom wall 9, the bottom wall being formed with openings 10 with which the upper ends of the tubes 6 are in communication. A lid 11 is removably fitted to the top of the container 7 and serves to close the top of the container and thus prevent the escape of steam or water at this point.

In the use of the attachment the same is fitted to the mouth of the bowl and coffee is introduced into the tubes 6, then the required quantity of boiling water is poured into the container so that it seeps through the coffee in the tubes and the coffee extract drips into the bowl 1.

What I claim is:—

A drip attachment for coffee urns comprising a cap member adapted to fit upon the top of the urn, said cap member having a series of openings with screens disposed across said openings, a series of tubes mounted upon the cap member and surrounding said openings, said tubes being arranged in circular form with their centers at equal distances from the center of the cap member and a pan mounted upon the upper ends of the tubes and having openings at its bottom registering with the upper ends of the tubes.

In testimony whereof I affix my signature.

LEWIS A. SCHERCK.